US012610362B2

(12) United States Patent
Jiang et al.

(10) Patent No.: US 12,610,362 B2
(45) Date of Patent: Apr. 21, 2026

(54) METHOD AND DEVICE FOR MULTICAST BROADCAST COMMUNICATION

(71) Applicant: Apogee Networks, LLC, Plano, TX (US)

(72) Inventors: Qi Jiang, Shanghai (CN); Xiaobo Zhang, Shanghai (CN)

(73) Assignee: Apogee Networks, LLC, Plano, TX (US)

( * ) Notice: Subject to any disclaimer, the term of this patent is extended or adjusted under 35 U.S.C. 154(b) by 175 days.

(21) Appl. No.: 18/138,119

(22) Filed: Apr. 23, 2023

(65) Prior Publication Data

US 2023/0262684 A1 Aug. 17, 2023

Related U.S. Application Data

(63) Continuation of application No. PCT/CN2021/135646, filed on Dec. 6, 2021.

(30) Foreign Application Priority Data

Dec. 11, 2020 (CN) .......................... 202011442861.7

(51) Int. Cl.
*H04W 72/1263* (2023.01)
*H04L 5/00* (2006.01)

(52) U.S. Cl.
CPC ....... *H04W 72/1263* (2013.01); *H04L 5/0048* (2013.01)

(58) Field of Classification Search
None
See application file for complete search history.

(56) References Cited

U.S. PATENT DOCUMENTS

2018/0076935 A1 3/2018 Seo

FOREIGN PATENT DOCUMENTS

WO 2019076207 A1 4/2019

OTHER PUBLICATIONS

ISR received in application No. PCT/CN2021/135646 dated Apr. 4, 2022.
Qualcomm Incorporated Views on reliability enhancement for Multicast RRC_CONNECTED UEs 3GPP TSG RAN WG1 #103-e R1-2009275 Oct. 24, 2020.
NTT DOCOMO, Inc. Views on UL HARQ-ACK feedback design for MTC 3GPP TSG RAN WG1 Meeting #93 R1-1807044 May 11, 2018.

(Continued)

*Primary Examiner* — Walter J Divito
(74) *Attorney, Agent, or Firm* — VOLPE KOENIG

(57) ABSTRACT

A method and a device in a node used for wireless communication. A node first receives K1 first-type signals, and then transmits a target signal, the target signal carrying a first bit block, wherein the first bit block includes K1 first-type information blocks, the K1 first-type information blocks are used for indicating whether the K1 first-type signals are correctly received respectively; a target identifier is used for generating a scrambling code of the target signal; one of the K1 first-type signals carries a first identifier, a second identifier is one identifier not equal to the first identifier, the target identifier is equal to one of the first identifier or the second identifier. The disclosure provides a method and device for optimizing a scrambling mode of feedback information under multicast and groupcast, thereby optimizing system performances.

20 Claims, 3 Drawing Sheets

100 — First Node

S101: receiving K1 first-type signals

S102: transmitting a target signal, the target signal carrying a first bit block End

(56)     References Cited

OTHER PUBLICATIONS

Moderator (Huawei) FL summary#4 on improving reliability for MBS for RRC_CONNECTED UEs 3GPP TSG RAN WG1 Meeting #103-e R1-2009716 Nov. 23, 2020.
CMCC Discussion on group scheduling mechanisms 3GPP TSG RAN WG1 #103-e R1-2008034 Oct. 23, 2020.
First Office Action of Chinese patent application No. CN202011442861.7 dated Jan. 31, 2024.
First Search Report of Chinese patent application No. CN202011442861.7 dated Jan. 29, 2024.
Third Generation Partnership Project, "Technical Specification Group Radio Access Network; NR; Multiplexing and channel coding (Release 16)," 3GPP TS 38.212 V16.3.0 (Sep. 2020).
Third Generation Partnership Project, "Technical Specification Group Radio Access Network; NR; Physical layer procedures for control (Release 16)," 3GPP TS 38.213 V16.3.0 (Sep. 2020).
Third Generation Partnership Project, "Technical Specification Group Radio Access Network; NR; Radio Resource Control (RRC) protocol specification (Release 16)," 3GPP TS 38.331 V16.2.0 (Sep. 2020).

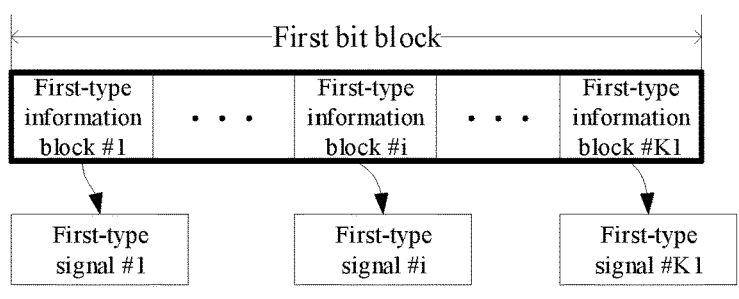
FIG. 7
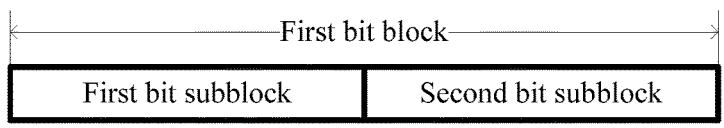
FIG. 8
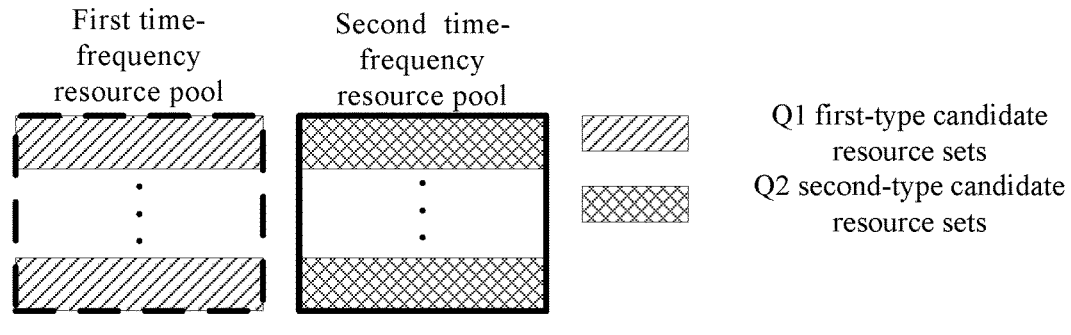
FIG. 9
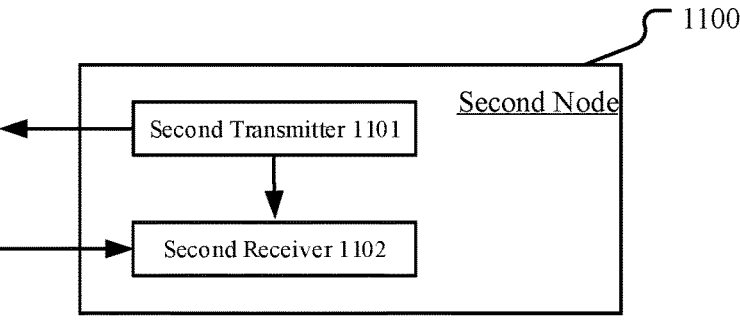
FIG. 10
FIG. 11

METHOD AND DEVICE FOR MULTICAST BROADCAST COMMUNICATION

CROSS-REFERENCE TO RELATED APPLICATION

This application is a continuation of the International Application No. PCT/CN2021/135646, filed Dec. 6, 2021, claiming the priority benefit of Chinese Patent Application Serial Number 202011442861.7, filed on Dec. 11, 2020, the full disclosure of which is incorporated herein by reference.

BACKGROUND

Technical Field

The disclosure relates to transmission methods and devices in wireless communication systems, and in particular to a method and device for design of uplink feedback in wireless communication.

RELATED ART

The NR Rel-17 standard has begun to discuss how to support transmission of multicast and broadcast services under 5G architecture. In traditional Long-Term Evolution (LTE) and Long-Term Evolution Advanced (LTE-A) systems, a base station supports a terminal receiving multicast/groupcast services through Multicast Broadcast Single Frequency Network (MBSFN) and Single-Cell Point-To-Multipoint (SC-PTM) modes. The NR system based multicast/groupcast services and the traditional multicast/groupcast services are different in that the NR will support a UE receiving unicast services and multicast/groupcast services in one timeslot at the same time; based on the above assumption, the uplink feedback of the UE will need a redesign.

SUMMARY

At present, a terminal will not be assumed to receive multiple Physical Downlink Shared Channels (PDSCH) that occupy overlapping time domain resources at the same time in one timeslot in one Bandwidth Part (BWP) of one serving cell. In the latest discussion of Rel-17 about Point-To-Multipoint (PTM), a UE is allowed to receive unicast and multicast/groupcast services at the same time in one timeslot, as a result of which the UE needs to receive in one timeslot two PDSCHs that are overlapping in time domain; further, in order to improve the flexibility of Hybrid Automatic Repeat reQuest Acknowledgement (HARQ-ACK) feedback, a HARQ-ACK for unicast and a HARQ-ACK for multicast/groupcast will be transmitted in one same physical channel; therefore, the transmission of the multiplexed HARQ-ACK based on unicast and multicast/groupcast needs a redesign.

In view of the above problems, the disclosure provides a solution. It is to be noted that although the communication scenario of PTM is taken for example in the above description, the disclosure is also applicable to other scenarios, such as unicast systems, and can achieve the technical effects similar to those in PTM. In addition, the adoption of a unified solution by different scenarios (including, but not limited to, PTM) is also beneficial to reducing the complexity and cost of hardware. The embodiments of any node in the disclosure and the characteristics of the embodiments may be applied to any other node if no conflict is incurred, and vice versa. The embodiments of the disclosure and the characteristics of the embodiments may be arbitrarily combined mutually if no conflict is incurred.

In view of the above problems, the disclosure provides a method and device for transmission of Uplink Control Information (UCI). It should be noted that the embodiments of the UE in the disclosure and the characteristics of the embodiments may be applied to the base station if no conflict is incurred, and vice versa. The embodiments of the disclosure and the characteristics of the embodiments may be arbitrarily combined mutually if no conflict is incurred. Further, although the original intention of the disclosure is towards cellular networks, the disclosure is also applicable to Internet of Things and Vehicle to Everything (V2X). Further, although the original intention of the disclosure is towards multicarrier communication, the disclosure is also applicable to single-carrier communication. Further, although the original intention of the disclosure is towards multicast/groupcast, the disclosure is also applicable to unicast communication. Further, although the original intention of the disclosure is towards terminal-base station scenarios, the disclosure is also applicable to communication scenarios between terminal and terminal, between terminal and relay, between Non-Terrestrial Networks (NTN), and between relay and base station, can achieve the technical effects similar to those in terminal-base station scenarios. In addition, the adoption of a unified solution by different scenarios (including, but not limited to, terminal-base station scenarios) is also beneficial to reducing the complexity and cost of hardware.

Further, the embodiments of the first node in the disclosure and the characteristics of the embodiments may be applied to the second node if no conflict is incurred, and vice versa. In particular, the terminologies, nouns, functions and variables in the disclosure can be explained with reference to the definitions in Technical Specification TS36 series, TS38 series and TS37 series of 3GPP (if not particularly stated).

The disclosure provides a method in a first node for wireless communication, including:

receiving K1 first-type signals, the K1 being a positive integer greater than 1; and transmitting a target signal, the target signal carrying a first bit block, the first bit block including a positive integer number of bits which is greater than 1.

Herein, the first bit block includes K1 first-type information blocks, the K1 first-type information blocks are used for indicating whether the K1 first-type signals are correctly received respectively; a target identifier is used for generating a scrambling code of the target signal; one of the K1 first-type signals carries a first identifier, a second identifier is one identifier not equal to the first identifier, the target identifier is equal to one of the first identifier or the second identifier; whether one of the K1 first-type signals carries the second identifier is used for determining the target identifier; the first identifier and the second identifier are both integers.

In one embodiment, the above method has one technical feature as follows: when the first bit block carries a HARQ-ACK corresponding to a multicast/groupcast service, the first bit block is scrambled with an RNTI associated to multicast/groupcast; when the first bit block does not carry a HARQ-ACK corresponding to a multicast/groupcast service, the first bit block is scrambled with an RNTI associated to unicast; the advantage of the above method is that, when the first bit block carries a HARQ-ACK corresponding to multicast/groupcast, the first bit block can be received by multiple base stations, thereby further improving the reception performance of the first bit block.

According to one aspect of the disclosure, the above method includes:

receiving K1 first-type signalings.

Herein, the K1 first-type signalings are used for indicating K1 first-type time-frequency resource sets respectively, and the K1 first-type signals occupy the K1 first-type time-frequency resource sets respectively.

In one embodiment, the above method has one technical feature as follows: the K1 first-type signals are all dynamically scheduled.

According to one aspect of the disclosure, the K1 first-type signals include a first signal and a second signal, the first signal carries the first identifier, the second signal carries the second identifier, and the target identifier is the second identifier.

According to one aspect of the disclosure, a given first-type signal carries the second identifier and the given first-type signal is one of the K1 first-type signals, the given first-type signal meets one of the following:

a CRC included in a physical layer dynamic signaling that schedules the given first-type signal is scrambled with the second identifier;

time-frequency resources occupied by a physical layer dynamic signaling that schedules the given first-type signal belongs to a first time-frequency resource set, the first time-frequency resource set employs a fixed index, or the first time-frequency resource set employs an index which is configured through a higher layer signaling; and a transport channel carrying the given first-type signal is a channel other than downlink shared channels.

According to one aspect of the disclosure, the above method includes:

receiving a first information block and a second information block.

Herein, the first information block is used for indicating a first time-frequency resource pool, and the second information block is used for indicating a second time-frequency resource pool; the target signal occupies a target time-frequency resource set; when the target identifier is the first identifier, the target time-frequency resource set belongs to the first time-frequency resource pool; when the target identifier is the second identifier, the target time-frequency resource set belongs to the second time-frequency resource pool; the first information block is specific to a first node, and the second information block is specific to a cell group.

According to one aspect of the disclosure, the K1 first-type signals include K2 first-type signals that all carry the first identifier, and the K1 first-type signals include K3 first-type signals that all carry the second identifier, the K2 and the K3 are positive integers greater than 0, and a summation of the K2 and the K3 is equal to the K1; K2 first-type information blocks among the K1 first-type information blocks are used for indicating whether the K2 first-type signals are correctly received respectively, K3 first-type information blocks among the K1 first-type information blocks are used for indicating whether the K3 first-type signals are correctly received respectively; the K1 first-type information blocks are mapped in sequence in the first bit block; any one of the K2 first-type information blocks occupies a bit that is earlier in position than a bit occupied by any one of the K3 first-type information blocks in the first bit block, or any one of the K3 first-type information blocks occupies a bit that is earlier in position than a bit occupied by any one of the K2 first-type information blocks in the first bit block.

In one embodiment, the above method has one technical feature as follows: a HARQ-ACK used for feeding back multicast/groupcast and a HARQ-ACK used for feeding back unicast are grouped and mapped in the first bit block, thereby realizing the multiplexing of two types of HARQ-ACKs under the premise of a minimum change to standards.

According to one aspect of the disclosure, any one of the K1 first-type signals carries the first identifier, a signal generated by the first bit block is QCLed to a first reference resource; or one of the K1 first-type signals carries the second identifier, a signal generated by the first bit block is QCLed to a second reference resource set; the first reference signal resource is non-QCLed to the second reference signal resource.

The disclosure provides a method in a second node for wireless communication, including:

transmitting K1 first-type signals, the K1 being a positive integer greater than 1; and receiving a target signal, the target signal carrying a first bit block, the first bit block including a positive integer number of bits which is greater than 1.

Herein, the first bit block includes K1 first-type information blocks, the K1 first-type information blocks are used for indicating whether the K1 first-type signals are correctly received respectively; a target identifier is used for generating a scrambling code of the target signal; one of the K1 first-type signals carries a first identifier, a second identifier is one identifier not equal to the first identifier, the target identifier is equal to one of the first identifier or the second identifier; whether one of the K1 first-type signals carries the second identifier is used for determining the target identifier; the first identifier and the second identifier are both integers.

According to one aspect of the disclosure, the above method includes:

transmitting K1 first-type signalings.

Herein, the K1 first-type signalings are used for indicating K1 first-type time-frequency resource sets respectively, and the K1 first-type signals occupy the K1 first-type time-frequency resource sets respectively.

According to one aspect of the disclosure, the K1 first-type signals include a first signal and a second signal, the first signal carries the first identifier, the second signal carries the second identifier, and the target identifier is the second identifier.

According to one aspect of the disclosure, a given first-type signal carries the second identifier and the given first-type signal is one of the K1 first-type signals, the given first-type signal meets one of the following:

a CRC included in a physical layer dynamic signaling that schedules the given first-type signal is scrambled with the second identifier;

time-frequency resources occupied by a physical layer dynamic signaling that schedules the given first-type signal belongs to a first time-frequency resource set, the first time-frequency resource set employs a fixed index, or the first time-frequency resource set employs an index which is configured through a higher layer signaling; and a transport channel carrying the given first-type signal is a channel other than downlink shared channels.

According to one aspect of the disclosure, the above method includes:

transmitting a first information block and a second information block.

Herein, the first information block is used for indicating a first time-frequency resource pool, and the second information block is used for indicating a second time-frequency resource pool; the target signal occupies a target time-frequency resource set; when the target identifier is the first identifier, the target time-frequency resource set belongs to the first time-frequency resource pool; when the target identifier is the second identifier, the target time-frequency resource set belongs to the second time-frequency resource pool; the first information block is specific to a first node, and the second information block is specific to a cell group.

According to one aspect of the disclosure, the K1 first-type signals include K2 first-type signals that all carry the first identifier, and the K1 first-type signals include K3 first-type signals that all carry the second identifier, the K2 and the K3 are positive integers greater than 0, and a summation of the K2 and the K3 is equal to the K1; K2 first-type information blocks among the K1 first-type information blocks are used for indicating whether the K2 first-type signals are correctly received respectively, K3 first-type information blocks among the K1 first-type information blocks are used for indicating whether the K3 first-type signals are correctly received respectively; the K1 first-type information blocks are mapped in sequence in the first bit block; any one of the K2 first-type information blocks occupies a bit that is earlier in position than a bit occupied by any one of the K3 first-type information blocks in the first bit block, or any one of the K3 first-type information blocks occupies a bit that is earlier in position than a bit occupied by any one of the K2 first-type information blocks in the first bit block.

According to one aspect of the disclosure, any one of the K1 first-type signals carries the first identifier, a signal generated by the first bit block is QCLed to a first reference resource; or one of the K1 first-type signals carries the second identifier, a signal generated by the first bit block is QCLed to a second reference resource set; the first reference signal resource is non-QCLed to the second reference signal resource.

The disclosure provides a first node for wireless communication, including:

a first receiver, to receive K1 first-type signals, the K1 being a positive integer greater than 1; and a first transmitter, to transmit a target signal, the target signal carrying a first bit block, the first bit block including a positive integer number of bits which is greater than 1;

Herein, the first bit block includes K1 first-type information blocks, the K1 first-type information blocks are used for indicating whether the K1 first-type signals are correctly received respectively; a target identifier is used for generating a scrambling code of the target signal; one of the K1 first-type signals carries a first identifier, a second identifier is one identifier not equal to the first identifier, the target identifier is equal to one of the first identifier or the second identifier; whether one of the K1 first-type signals carries the second identifier is used for determining the target identifier; the first identifier and the second identifier are both integers.

The disclosure provides a second node for wireless communication, including:

a second transmitter, to transmit K1 first-type signals, the K1 being a positive integer greater than 1; and a second receiver, to receive a target signal, the target signal carrying a first bit block, the first bit block including a positive integer number of bits which is greater than 1.

Herein, the first bit block includes K1 first-type information blocks, the K1 first-type information blocks are used for indicating whether the K1 first-type signals are correctly received respectively; a target identifier is used for generating a scrambling code of the target signal; one of the K1 first-type signals carries a first identifier, a second identifier is one identifier not equal to the first identifier, the target identifier is equal to one of the first identifier or the second identifier; whether one of the K1 first-type signals carries the second identifier is used for determining the target identifier; the first identifier and the second identifier are both integers.

In one embodiment, compared with conventional schemes, the disclosure has the following advantages.

When the first bit block carries a HARQ-ACK corresponding to a multicast/groupcast service, the first bit block is scrambled with an RNTI associated to multicast/groupcast; when the first bit block does not carry a HARQ-ACK corresponding to a multicast/groupcast service, the first bit block is scrambled with an RNTI associated to unicast; the advantage of the above method is that, when the first bit block carries a HARQ-ACK corresponding to multicast/groupcast, the first bit block can be received by multiple base stations, thereby further improving the reception performance of the first bit block.

A HARQ-ACK used for feeding back multicast/groupcast and a HARQ-ACK used for feeding back unicast are grouped and mapped in the first bit block, thereby realizing the multiplexing of two types of HARQ-ACKs under the premise of a minimum change to standards.

When the first bit block carries a HARQ-ACK corresponding to a multicast/groupcast service, a dedicated beamforming vector is employed for transmission, so as to ensure the performance of transmission of the first bit block.

BRIEF DESCRIPTION OF THE DRAWINGS

Other features, purposes and advantages of the disclosure will become more apparent from the detailed description of non-restrictive embodiments taken in conjunction with the following drawings.

FIG. 7 is a diagram illustrating a first bit block according to one embodiment of the disclosure.

FIG. 8 is a diagram illustrating a first bit block according to another embodiment of the disclosure.

FIG. 9 is a diagram illustrating a first time-frequency resource pool and a second time-frequency resource pool according to one embodiment of the disclosure.

FIG. 10 is a structure block diagram illustrating a processing device in a first node equipment according to one embodiment of the disclosure.

FIG. 11 is a structure block diagram illustrating a processing device in a second node equipment according to one embodiment of the disclosure.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
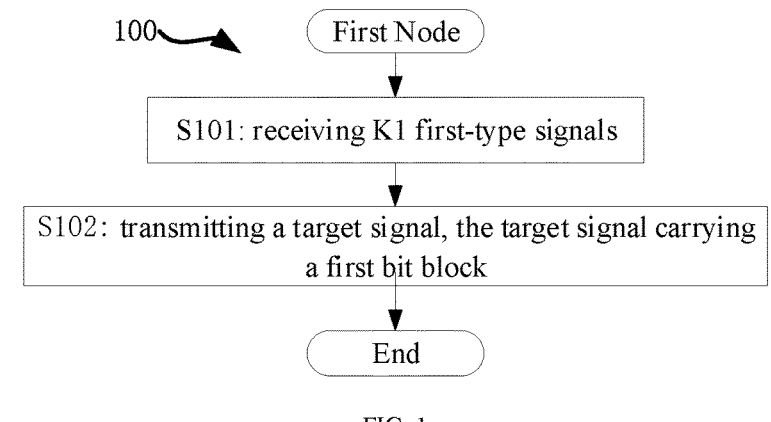
FIG. 1 is a flowchart of processing of a first node according to one embodiment of the disclosure.

Embodiment 1 illustrates a flowchart of processing of a first node, as shown in FIG. 1. In 100 shown in FIG. 1, each box represents one step. In Embodiment 1, the first node in the disclosure receives K1 first-type signals in S101, and transmits a target signal in S102, the target signal carrying a first bit block.

In Embodiment 1, the K1 is a positive integer greater than 1, the first bit block includes a positive integer number of bits which is greater than 1, the first bit block includes K1 first-type information blocks, the K1 first-type information blocks are used for indicating whether the K1 first-type signals are correctly received respectively; a target identifier is used for generating a scrambling code of the target signal; one of the K1 first-type signals carries a first identifier, a second identifier is one identifier not equal to the first identifier, the target identifier is equal to one of the first identifier or the second identifier; whether one of the K1 first-type signals carries the second identifier is used for determining the target identifier; the first identifier and the second identifier are both integers.

In one embodiment, the first-type signal in the disclosure includes a baseband signal.

In one embodiment, the first-type signal in the disclosure includes a radio signal.

In one embodiment, the target signal in the disclosure includes a baseband signal.

In one embodiment, the target signal in the disclosure includes a radio signal.

In one embodiment, a physical layer channel occupied by any one of the K1 first-type signals includes a PDSCH.

In one embodiment, a transport channel occupied by any one of the K1 first-type signals includes a Downlink Shared Channel (DL-SCH).

In one embodiment, a physical layer channel occupied by any one of the K1 first-type signals includes a Physical Sidelink Shared Channel (PSSCH).

In one embodiment, a transport channel occupied by any one of the K1 first-type signals includes a Sidelink Shared Channel (SL-SCH).

In one embodiment, any one of the K1 first-type signals is used for a unicast service.

In one embodiment, a physical layer channel occupied by at least one of the K1 first-type signals includes a PDSCH.

In one embodiment, a transport channel occupied by at least one of the K1 first-type signals includes a DL-SCH.

In one embodiment, a physical layer channel occupied by at least one of the K1 first-type signals includes a PSSCH.

In one embodiment, a transport channel occupied by at least one of the K1 first-type signals includes an SL-SCH.

In one embodiment, a physical layer channel occupied by at least one of the K1 first-type signals includes a Physical Multicast Channel (PMCH).

In one embodiment, a transport channel occupied by at least one of the K1 first-type signals includes an SL-MCH.

In one embodiment, a logical channel occupied by at least one of the K1 first-type signals includes a Multicast Traffic Channel (MTCH).

In one embodiment, a logical channel occupied by at least one of the K1 first-type signals includes a Multicast Control Channel (MCCH).

In one embodiment, at least one of the K1 first-type signals is used for a multicast/groupcast service.

In one embodiment, the K1 is equal to 2.

In one embodiment, the K1 first-type signals are generated by K1 Transport Blocks (TBs) respectively.

In one embodiment, the K1 first-type signals are generated by K1 data blocks respectively.

In one embodiment, the K1 first-type signals are generated by K1 Code Block Groups (CBGs) respectively.

In one embodiment, at least two of the K1 first-type signals are generated by one same TB.

In one embodiment, the K1 first-type signals occupy K1 HARQ-ACK processes respectively.

In one embodiment, at least two of the K1 first-type signals occupy one same HARQ-ACK process.

In one embodiment, the first bit block is one UCI.

In one embodiment, the first bit block is used for generating a Physical Sidelink Feedback Channel (PSFCH).

In one embodiment, a physical layer channel carrying the target signal includes a Physical Uplink Shared Channel (PUSCH).

In one embodiment, a physical layer channel carrying the target signal includes a Physical Uplink Control Channel (PUCCH).

In one embodiment, a physical layer channel carrying the target signal includes a PSFCH.

In one embodiment, the K1 first-type information blocks are HARQ-ACK feedbacks against the K1 first-type signals respectively.

In one embodiment, any one of the K1 first-type information blocks includes one information bit.

In one embodiment, at least one of the K1 first-type information blocks includes more than one information bit.

In one embodiment, the above phrase that a target identifier is used for generating a scrambling code of the target signal means: a generator of a scrambling sequence employed by the target signal is initialized through the target identifier.

In one embodiment, the above phrase that a target identifier is used for generating a scrambling code of the target signal means: a CRC included in the target signal is scrambled with the target identifier.

In one embodiment, the first identifier is a non-negative integer.

In one embodiment, the second identifier is a non-negative integer.

In one embodiment, the first identifier is a Cell Radio Network Temporary Identifier (C-RNTI).

In one embodiment, the first identifier is specific to a UE.

In one embodiment, the first identifier is specific to a cell.

In one embodiment, the second identifier is a Group Radio Network Temporary Identifier (G-RNTI).

In one embodiment, the second identifier is a Group Common Radio Network Temporary Identifier (GC-RNTI).

In one embodiment, the second identifier is a Single Carrier Radio Network Temporary Identifier (SC-RNTI).

In one embodiment, the second identifier is a Single Carrier Point to Multipoint Radio Network Temporary Identifier (SC-PTM-RNTI).

In one embodiment, the second identifier is a Single Carrier Single Frequency Network Radio Network Temporary Identifier (SC-SFN-RNTI).

In one embodiment, the second identifier is specific to a cell group.

In one embodiment, the second identifier is specific to a service.

In one embodiment, the phrase that one first-type signal carries a first identifier means: a generator of a scrambling sequence employed by the first-type signal is initialized through the first identifier.

In one embodiment, the phrase that one first-type signal carries a first identifier means: a CRC (Cyclic Redundancy Check) included in the first-type signal is scrambled with the first identifier.

In one embodiment, the phrase that one first-type signal carries a first identifier means: the first-type signal is used for indicating the first identifier.

In one embodiment, the phrase that one first-type signal carries a first identifier means: the first-type signal includes the first identifier.

In one embodiment, the phrase that one first-type signal carries a second identifier means: a generator of a scrambling sequence employed by the first-type signal is initialized through the second identifier.

In one embodiment, the phrase that one first-type signal carries a second identifier means: a CRC included in the first-type signal is scrambled with the second identifier.

In one embodiment, the phrase that one first-type signal carries a second identifier means: the first-type signal is used for indicating the second identifier.

In one embodiment, the phrase that one first-type signal carries a second identifier means: the first-type signal includes the second identifier.

In one embodiment, none of the K1 first-type signals carries the second identifier, and the target identifier is equal to the first identifier.

In one embodiment, one of the K1 first-type signals carries the second identifier, and the target identifier is equal to the second identifier.

Embodiment 2

Figure 2:
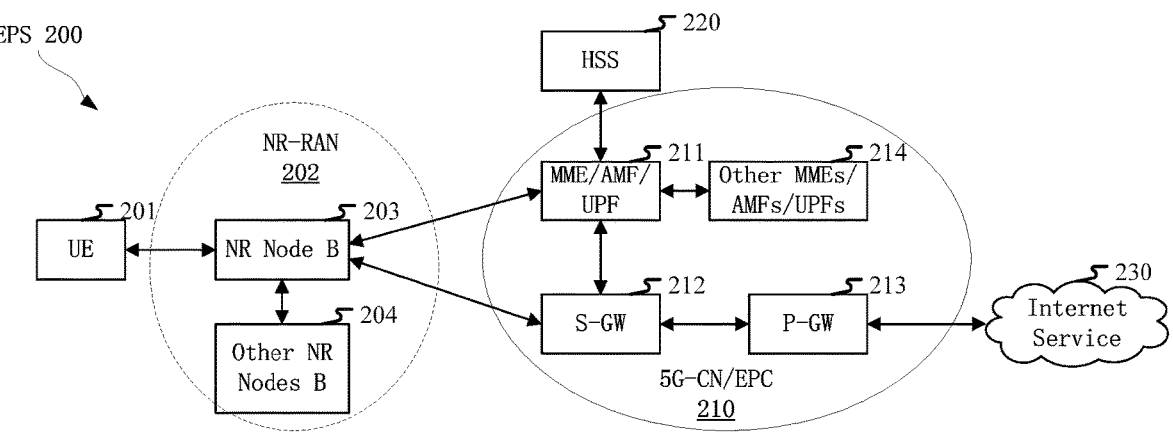
FIG. 2 is a diagram illustrating a network architecture according to one embodiment of the disclosure.

Embodiment 2 illustrates a diagram of a network architecture, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called an Evolved Packet System (EPS) 200 or some other appropriate terms. The EPS 200 may include one UE 201, a Next Generation-Radio Access Network (NG-RAN) 202, an Evolved Packet Core/ 5G-Core Network (EPC/5G-CN) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), satellite radios, non-terrestrial base statin communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one embodiment, the UE 201 corresponds to the first node in the disclosure.

In one embodiment, the UE 201 is a terminal capable of supporting unicast services and multicast/groupcast services at the same time.

In one embodiment, the UE 201 can receive two PDSCHs overlapping in time domain at the same time in one carrier.

In one embodiment, the UE 201 supports a HARQ-ACK for feeding back a unicast service and a HARQ-ACK for feeding back a multicast/groupcast service being multiplexed in one physical channel.

In one embodiment, the gNB203 corresponds to the second node in the disclosure.

In one embodiment, the gNB203 is a base station capable of supporting unicast services and multicast/groupcast services at the same time.

In one embodiment, the gNB203 can transmit two PDSCHs overlapping in time domain at the same time in one carrier.

In one embodiment, the gNB203 supports a HARQ-ACK for feeding back a unicast service and a HARQ-ACK for feeding back a multicast/groupcast service being multiplexed in one physical channel.

Embodiment 3

Figure 3:
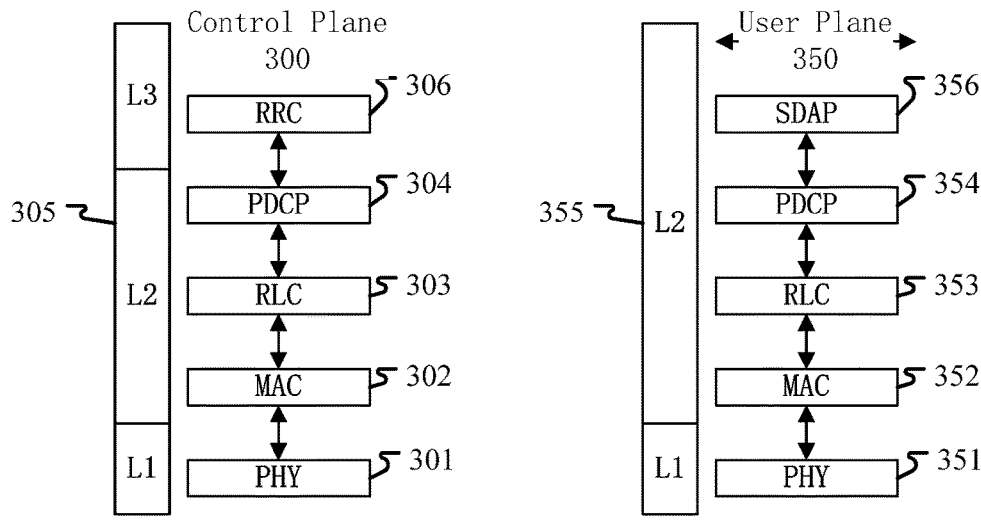
FIG. 3 is a diagram illustrating an embodiment of a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3. FIG. 3 is a diagram illustrating an embodiment of a radio protocol architecture of a user plane 350 and a control plane 300. In FIG. 3, the radio protocol architecture of a control plane 300 between a first communication node equipment (UE, gNB or RSU in V2X) and a second communication node equipment (gNB, UE or RSU in V2X) is illustrated by three layers, which are a Layer 1, a Layer 2 and a Layer 3 respectively. The Layer 1 (L1 layer) is the lowest layer and implements various PHY (physical layer) signal processing functions. The L1 layer will be referred to herein as the PHY 301. The Layer 2 (L2 layer) 305 is above the PHY 301, and is responsible for the links between the first communication node equipment and the second communication node equipment over the PHY 301. The L2 Layer 305 includes a Medium Access Control (MAC) sublayer 302, a Radio Link Control (RLC) sublayer 303, and a Packet Data Convergence Protocol (PDCP) sublayer 304, which are terminated at the second communication node equipment. The PDCP sublayer 304 provides multiplexing between different radio bearers and logical channels. The PDCP sublayer 304 also provides security by encrypting packets and provides support for handover of the first communication node equipment between second communication node equipments. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among the first communication node equipment. The MAC sublayer 302 is also in charge of HARQ operations. The RRC sublayer 306 in the Layer 3 (L3 layer) in the control plane 300 is responsible for acquiring radio resources (i.e. radio bearers) and configuring lower layers using an RRC signaling between the second communication node equipment and the first communication node equipment. The radio protocol architecture of the user plane 350 includes a Layer 1 (L1 layer) and a Layer 2 (L2 layer); the radio protocol architecture for the first communication node equipment and the second communication node equipment in the user plane 350 on the PHY 351, the PDCP sublayer 354 in the L2 Layer 355, the RLC sublayer 353 in the L2 Layer 355 and the MAC sublayer 352 in the L2 Layer 355 is substantially the same as the radio protocol architecture on corresponding layers and sublayers in the control plane 300, with the exception that the PDCP sublayer 354 also provides header compression for higher-layer packets so as to reduce radio transmission overheads. The L2 Layer 355 in the user plane 350 further includes a Service Data Adaptation Protocol (SDAP) sublayer 356; the SDAP sublayer 356 is in charge of mappings between QoS flows and Data Radio Bearers (DRBs), so as to support diversification of services. Although not shown, the first communication node equipment may include several higher layers above the L2 Layer 355, including a network layer (i.e. IP layer) terminated at the P-GW on the network side and an application layer terminated at the other end (i.e. a peer UE, a server, etc.) of the connection.

In one embodiment, the radio protocol architecture shown in FIG. 3 is applicable to the first node in the disclosure.

In one embodiment, the radio protocol architecture shown in FIG. 3 is applicable to the second node in the disclosure.

In one embodiment, the PDCP304 of the second communication node equipment is used for generating a scheduling of the first communication node equipment.

In one embodiment, the PDCP354 of the second communication node equipment is used for generating a scheduling of the first communication node equipment.

In one embodiment, the K1 first-type signals in the disclosure are all generated on the PHY 301 or PHY 351.

In one embodiment, the K1 first-type signals in the disclosure are all generated on the MAC 302 or MAC 352.

In one embodiment, the K1 first-type signals in the disclosure are all generated on the RRC 306.

In one embodiment, the target signal in the disclosure is generated on the PHY 301 or PHY 351.

In one embodiment, the target signal in the disclosure is generated on the MAC 302 or MAC 352.

In one embodiment, the target signal in the disclosure is generated on the RRC 306.

In one embodiment, the K1 first-type signalings in the disclosure are all generated on the PHY 301 or PHY 351.

In one embodiment, the K1 first-type signalings in the disclosure are all generated on the MAC 302 or MAC 352.

In one embodiment, the K1 first-type signalings in the disclosure are all generated on the RRC 306.

In one embodiment, the first information block in the disclosure is generated on the MAC 302 or MAC 352.

In one embodiment, the first information block in the disclosure is generated on the RRC 306.

In one embodiment, the second information block in the disclosure is generated on the MAC 302 or MAC 352.

In one embodiment, the second information block in the disclosure is generated on the RRC 306.

In one embodiment, the first node is one terminal.

In one embodiment, the second node is one terminal.

In one embodiment, the second node is one RSU (Road Side Unit).

In one embodiment, the second node is one grouphead.

In one embodiment, the second node is one TRP (Transmitter Receiver Point)

In one embodiment, the second node is one cell.

In one embodiment, the second node is one eNB.

In one embodiment, the second node is one base station.

In one embodiment, the second node is used for managing a plurality of base stations.

In one embodiment, the second node is a node used for managing a plurality of cells.

In one embodiment, the second node is used for managing a plurality of TRPs.

Embodiment 4

Figure 4:
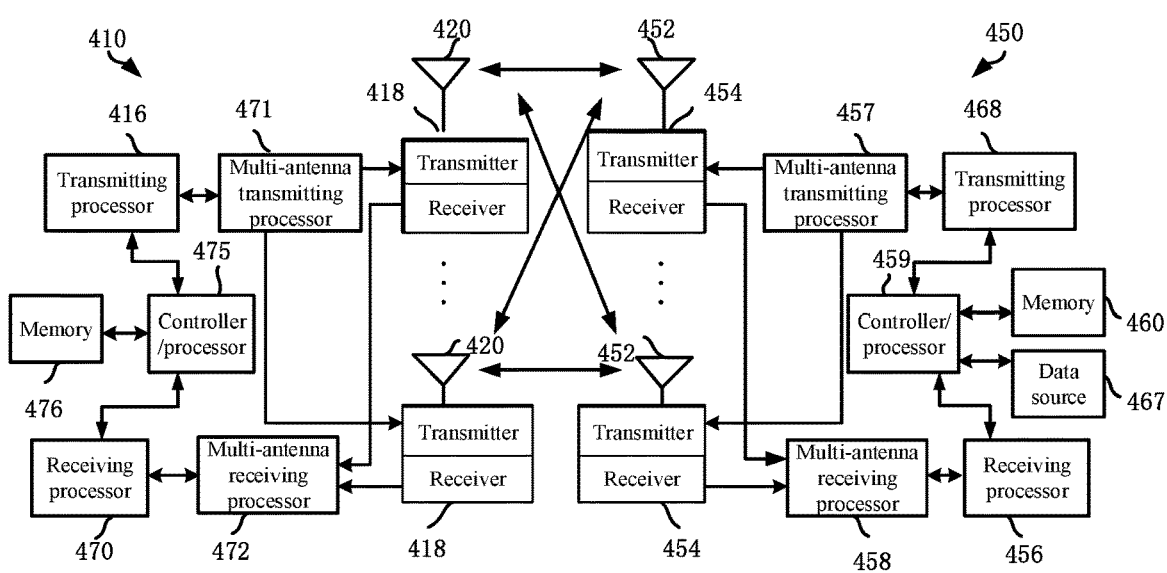
FIG. 4 is a diagram illustrating a first communication equipment and a second communication equipment according to one embodiment of the disclosure.

Embodiment 4 illustrates a diagram of a first communication equipment and a second communication equipment according to the disclosure, as shown in FIG. 4. FIG. 4 is a block diagram of a first communication equipment 450 and a second communication equipment 410 that are in communication with each other in an access network.

The first communication equipment 450 includes a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication equipment 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication equipment 410 to the first communication equipment 450, at the second communication equipment 410, a higher-layer packet from a core network is provided to the controller/processor 475. The controller/processor 475 provides functions of Layer 2. In the transmission from the second communication equipment 410 to the first communication equipment 450, the controller/processor 475 provides header compression, encryption, packet segmentation and reordering, multiplexing between a logical channel and a transport channel, and a radio resource allocation for the first communication equipment 450 based on various priority metrics. The controller/processor 475 is also in charge of retransmission of lost packets, and signalings to the first communication equipment 450. The transmitting processor 416 and the multi-antenna transmitting processor 471 perform various signal processing functions used for Layer 1 (that is, PHY). The transmitting processor 416 performs encoding and interleaving so as to ensure FEC (Forward Error Correction) at the second communication equipment 410 and mappings to signal clusters corresponding to different modulation schemes (i.e., BPSK, QPSK, M-PSK M-QAM, etc.). The multi-antenna transmitting processor 471 processes the encoded and modulated symbols with digital spatial precoding (including precoding based on codebook and precoding based on non-codebook) and beamforming to generate one or more spatial streams. The transmitting processor 416 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 471 processes the time-domain multicarrier symbol streams with transmitting analog precoding/beamforming. Each transmitter 418 converts a baseband multicarrier symbol stream provided by the multi-antenna transmitting processor 471 into a radio frequency stream and then provides it to different antennas 420.

In a transmission from the second communication equipment 410 to the first communication equipment 450, at the first communication equipment 450, each receiver 454 receives a signal via the corresponding antenna 452. Each receiver 454 recovers the information modulated to the RF carrier and converts the radio frequency stream into a baseband multicarrier symbol stream to provide to the receiving processor 456. The receiving processor 456 and the multi-antenna receiving processor 458 perform various signal processing functions of Layer 1. The multi-antenna receiving processor 458 processes the baseband multicarrier symbol stream coming from the receiver 454 with receiving analog precoding/beamforming. The receiving processor 456 converts the baseband multicarrier symbol stream subjected to the receiving analog precoding/beamforming operation from time domain into frequency domain using FFT (Fast Fourier Transform). In frequency domain, a physical layer data signal and a reference signal are demultiplexed by the receiving processor 456, wherein the reference signal is used for channel estimation, and the data signal is subjected to multi-antenna detection in the multi-antenna receiving processor 458 to recover any spatial stream targeting the first communication equipment 450. Symbols on each spatial stream are demodulated and recovered in the receiving processor 456 to generate a soft decision. Then, the receiving processor 456 decodes and de-interleaves the soft decision to recover the higher-layer data and control signal on the physical channel transmitted by the second communication equipment 410. Next, the higher-layer data and control signal are provided to the controller/processor 459. The controller/processor 459 performs functions of Layer 2. The controller/processor 459 may be connected to the memory 460 that stores program codes and data. The memory 460 may be called a computer readable media. In the transmission from the second communication equipment 410 to the first communication equipment 450, the controller/processor 459 provides multiplexing between the transport channel and the logical channel, packet reassembling, decryption, header decompression, and control signal processing so as to recover the higher-layer packet coming from the core network. The higher-layer packet is then provided to all protocol layers above Layer 2, or various control signals can be provided to Layer 3 for processing.

In a transmission from the first communication equipment 450 to the second communication equipment 410, at the first communication equipment 450, the data source 467 provides a higher-layer packet to the controller/processor 459. The data source 467 illustrates all protocol layers above the L2 layer. Similar as the transmitting function of the second communication equipment 410 described in the transmission from the second communication equipment 410 to the first communication equipment 450, the controller/processor 459 provides header compression, encryption, packet segmentation and reordering, and multiplexing between a logical channel and a transport channel based on radio resource allocation so as to provide the functions of L2 layer used for the control plane and user plane. The controller/processor 459 is also in charge of retransmission of lost packets, and signalings to the second communication equipment 410. The transmitting processor 468 conducts modulation mapping and channel encoding processing; the multi-antenna transmitting processor 457 performs digital multi-antenna spatial precoding (including precoding based on codebook and precoding based on non-codebook) and beaming processing; and subsequently, the transmitting processor 468 modulates the generated spatial streams into a multicarrier/single-carrier symbol stream, which is subjected to an analog precoding/beamforming operation in the multi-antenna transmitting processor 457 and then is provided to different antennas 452 via the transmitter 454. Each transmitter 452 first converts the baseband symbol stream provided by the multi-antenna transmitting processor 457 into a radio frequency symbol stream and then provides the radio frequency symbol stream to the antenna 452.

In a transmission from the first communication equipment 450 to the second communication equipment 410, the function of the second communication equipment 410 is similar as the receiving function of the first communication equipment 450 described in the transmission from second communication equipment 410 to the first communication equipment 450. Each receiver 418 receives a radio frequency signal via the corresponding antenna 420, converts the received radio frequency signal into a baseband signal, and provides the baseband signal to the multi-antenna receiving processor 472 and the receiving processor 470. The receiving processor 470 and the multi-antenna receiving processor 472 together provide functions of Layer 1. The controller/processor 475 provides functions of Layer 2. The controller/processor 475 may be connected to the memory 476 that stores program codes and data. The memory 476 may be called a computer readable media. In the transmission from the first communication equipment 450 to the second communication equipment 410, the controller/processor 475 provides de-multiplexing between the transport channel and the logical channel, packet reassembling, decryption, header decompression, and control signal processing so as to recover higher-layer packets coming from the UE 450. The higher-layer packet, coming from the controller/processor 475, may be provided to the core network.

In one embodiment, the first communication equipment 450 includes at least one processor and at least one memory. The at least one memory includes computer program codes. The at least one memory and the computer program codes are configured to be used in collaboration with the at least one processor. The first communication equipment 450 at least receives K1 first-type signals, the K1 being a positive integer greater than 1, and transmits a target signal, the target signal carrying a first bit block, the first bit block including a positive integer number of bits which is greater than 1; wherein the first bit block includes K1 first-type information blocks, the K1 first-type information blocks are used for indicating whether the K1 first-type signals are correctly received respectively; a target identifier is used for generating a scrambling code of the target signal; one of the K1 first-type signals carries a first identifier, a second identifier is one identifier not equal to the first identifier, the target identifier is equal to one of the first identifier or the second identifier; whether one of the K1 first-type signals carries the second identifier is used for determining the target identifier; the first identifier and the second identifier are both integers.

In one embodiment, the first communication equipment 450 includes a memory that stores a computer readable instruction program. The computer readable instruction program generates an action when executed by at least one processor. The action includes receiving K1 first-type signals, the K1 being a positive integer greater than 1, and transmitting a target signal, the target signal carrying a first bit block, the first bit block including a positive integer number of bits which is greater than 1; wherein the first bit block includes K1 first-type information blocks, the K1 first-type information blocks are used for indicating whether the K1 first-type signals are correctly received respectively; a target identifier is used for generating a scrambling code of the target signal; one of the K1 first-type signals carries a first identifier, a second identifier is one identifier not equal to the first identifier, the target identifier is equal to one of the first identifier or the second identifier; whether one of the K1 first-type signals carries the second identifier is used for determining the target identifier; the first identifier and the second identifier are both integers.

In one embodiment, the second communication equipment 410 includes at least one processor and at least one memory. The at least one memory includes computer program codes. The at least one memory and the computer program codes are configured to be used in collaboration with the at least one processor. The second communication equipment 410 at least transmits K1 first-type signals, the K1 being a positive integer greater than 1, and receives a target signal, the target signal carrying a first bit block, the first bit block including a positive integer number of bits which is greater than 1; wherein the first bit block includes K1 first-type information blocks, the K1 first-type information blocks are used for indicating whether the K1 first-type signals are correctly received respectively; a target identifier is used for generating a scrambling code of the target signal; one of the K1 first-type signals carries a first identifier, a second identifier is one identifier not equal to the first identifier, the target identifier is equal to one of the first identifier or the second identifier; whether one of the K1 first-type signals carries the second identifier is used for determining the target identifier; the first identifier and the second identifier are both integers.

In one embodiment, the second communication equipment 410 includes a memory that stores a computer readable instruction program. The computer readable instruction program generates an action when executed by at least one processor. The action includes transmitting K1 first-type signals, the K1 being a positive integer greater than 1, and receiving a target signal, the target signal carrying a first bit block, the first bit block including a positive integer number of bits which is greater than 1; wherein the first bit block includes K1 first-type information blocks, the K1 first-type information blocks are used for indicating whether the K1 first-type signals are correctly received respectively; a target identifier is used for generating a scrambling code of the target signal; one of the K1 first-type signals carries a first identifier, a second identifier is one identifier not equal to the first identifier, the target identifier is equal to one of the first identifier or the second identifier; whether one of the K1 first-type signals carries the second identifier is used for determining the target identifier; the first identifier and the second identifier are both integers.

In one embodiment, the first communication equipment 450 corresponds to the first node in the disclosure.

In one embodiment, the second communication equipment 410 corresponds to the second node in the disclosure.

In one embodiment, the first communication equipment 450 is one UE.

In one embodiment, the first communication equipment 450 is one terminal.

In one embodiment, the second communication equipment 410 is one base station.

In one embodiment, the second communication equipment 410 is one UE.

In one embodiment, the second communication equipment 410 is one network device.

In one embodiment, the second communication equipment 410 is one serving cell.

In one embodiment, the second communication equipment 410 is one TRP.

In one embodiment, at least the former four of the antenna 452, the receiver 454, the multiantenna receiving processor 458, the receiving processor 456 or the controller/processor 459 are used for receiving K1 first-type signals; and at least the former four of the antenna 420, the transmitter 418, the multiantenna transmitting processor 471, the transmitting processor 416 or the controller/processor 475 are used for transmitting K1 first-type signals.

In one embodiment, at least the former four of the antenna 452, the transmitter 454, the multiantenna transmitting processor 457, the transmitting processor 468 or the controller/processor 459 are used for transmitting a target signal, the target signal carrying a first bit block; and at least the former four of the antenna 420, the receiver 418, the multiantenna receiving processor 472, the receiving processor 470 or the controller/processor 475 are used for receiving a target signal, the target signal carrying a first bit block.

In one embodiment, at least the former four of the antenna 452, the receiver 454, the multiantenna receiving processor 458, the receiving processor 456 or the controller/processor 459 are used for receiving K1 first-type signalings; and at least the former four of the antenna 420, the transmitter 418, the multiantenna transmitting processor 471, the transmitting processor 416 or the controller/processor 475 are used for transmitting K1 first-type signalings.

In one embodiment, at least the former four of the antenna 452, the receiver 454, the multiantenna receiving processor 458, the receiving processor 456 or the controller/processor 459 are used for receiving a first information block and a second information block; and at least the former four of the antenna 420, the transmitter 418, the multiantenna transmitting processor 471, the transmitting processor 416 or the controller/processor 475 are used for transmitting a first information block and a second information block.

Embodiment 5

Figure 5:
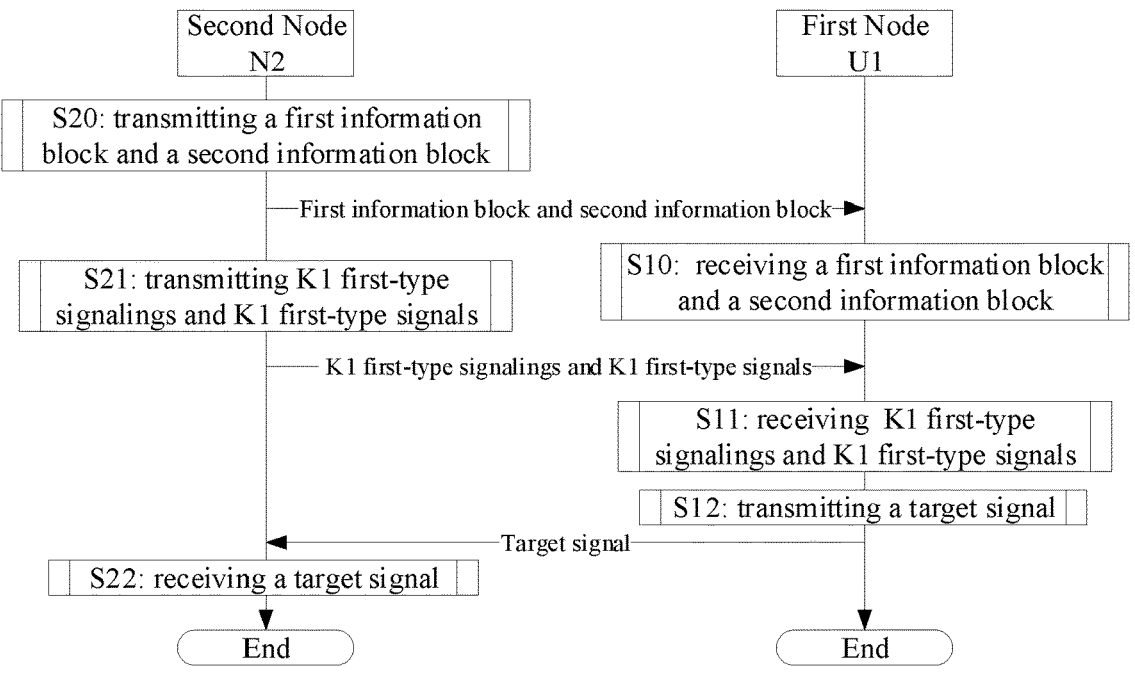
FIG. 5 is a flowchart of a target signal according to one embodiment of the disclosure.

Embodiment 5 illustrates a flowchart of a target signal, as shown in FIG. 5. In FIG. 5, a first node U1 communicates with a second node N2 through a radio link, the steps marked by a box FO are optional; it is to be noted that the order in the present embodiment does not limit the order of signal transmission and the order of implementation in the disclosure.

The first node U1 receives a first information block and a second information block in S10, receives K1 first-type signalings and K1 first-type signals in S11, and transmits a target signal in S12.

The second node N2 transmits a first information block and a second information block in S20, transmits K1 first-type signalings and K1 first-type signals in S21, and receives a target signal in S22.

In Embodiment 5, the K1 is a positive integer greater than 1; the target signal carrying a first bit block, and the first bit block includes a positive integer number of bits which is greater than 1; the first bit block includes K1 first-type information blocks, the K1 first-type information blocks are used for indicating whether the K1 first-type signals are correctly received respectively; a target identifier is used for generating a scrambling code of the target signal; one of the K1 first-type signals carries a first identifier, a second identifier is one identifier not equal to the first identifier, the target identifier is equal to one of the first identifier or the second identifier; whether one of the K1 first-type signals carries the second identifier is used for determining the target identifier; the first identifier and the second identifier are both integers; the K1 first-type signalings are used for indicating K1 first-type time-frequency resource sets respectively, and the K1 first-type signals occupy the K1 first-type time-frequency resource sets respectively; the first information block is used for indicating a first time-frequency resource pool, and the second information block is used for indicating a second time-frequency resource pool; the target signal occupies a target time-frequency resource set; when the target identifier is the first identifier, the target time-frequency resource set belongs to the first time-frequency resource pool; when the target identifier is the second identifier, the target time-frequency resource set belongs to the second time-frequency resource pool; the first information block is specific to the first node U1, and the second information block is specific to a cell group.

In one embodiment, a physical layer channel occupied by any one of the K1 first-type signalings includes a Physical Downlink Control Channel (PDCCH).

In one embodiment, a physical layer channel occupied by any one of the K1 first-type signalings includes a Physical Sidelink Control Channel (PSCCH).

In one embodiment, any one of the K1 first-type signalings is Downlink Control Information (DCI).

In one embodiment, any one of the K1 first-type signalings is Sidelink Control Information (SCI).

In one embodiment, any one of the K1 first-type signalings is one downlink grant.

In one embodiment, any one of the K1 first-type signalings is one RRC signaling.

In one embodiment, at least one of the K1 first-type signalings is an RRC signaling.

In one embodiment, a physical layer channel occupied by any one of the K1 first-type signalings includes a PSCCH.

In one embodiment, the K1 first-type signalings are used for scheduling the K1 first-type signals respectively.

In one embodiment, any one of the K1 first-type time-frequency resource sets occupies a positive integer number of REs which is greater than 1.

In one embodiment, the target signal occupies a target time-frequency resource set.

In one subembodiment, the K1 first-type signalings are all used for indicating the target time-frequency resource set.

In one subembodiment, the target time-frequency resource set is associated to the K1 first-type signalings.

In one subembodiment, at least one of the K1 first-type signalings is used for indicating the target time-frequency resource set.

In one embodiment, the K1 first-type signals include a first signal and a second signal, the first signal carries the first identifier, the second signal carries the second identifier, and the target identifier is the second identifier.

In one subembodiment, time domain resources occupied by the first signal are overlapping with time domain resources occupied by the second signal.

In one subembodiment, at least one Orthogonal Frequency Division Multiplexing (OFDM) symbol belongs to time domain resources occupied by the first signal and time domain resources occupied by the second signal simultaneously.

In one subembodiment, time domain resources occupied by the first signal and time domain resources occupied by the second signal belong to one same timeslot.

In one subembodiment, frequency domain resources occupied by the first signal and frequency domain resources occupied by the second signal belong to one same BWP.

In one subembodiment, frequency domain resources occupied by the first signal and frequency domain resources occupied by the second signal belong to one same carrier.

In one embodiment, a given first-type signal carries the second identifier and the given first-type signal is one of the K1 first-type signals, the given first-type signal meets one of the following:

a CRC included in a physical layer dynamic signaling that schedules the given first-type signal is scrambled with the second identifier;

time-frequency resources occupied by a physical layer dynamic signaling that schedules the given first-type signal belongs to a first time-frequency resource set, the first time-frequency resource set employs a fixed index, or the first time-frequency resource set employs an index which is configured through a higher layer signaling; and a transport channel carrying the given first-type signal is a channel other than downlink shared channels.

In one subembodiment, the physical layer dynamic signaling that schedules the given first-type signal includes a PDCCH.

In one subembodiment, the physical layer dynamic signaling that schedules the given first-type signal includes a PSCCH.

In one subembodiment, the first time-frequency resource set is one Control Resource Set (CORESET).

In one subembodiment, the index employed by the first time-frequency resource set is a ControlResourceSetId.

In one subembodiment, the first time-frequency resource set is one CORESET Pool.

In one subembodiment, the index employed by the first time-frequency resource set is a conresetPoolIndex.

In one subembodiment, the first time-frequency resource set is one Search Space.

In one subembodiment, the first time-frequency resource set is one Search Space Set.

In one subembodiment, the index employed by the first time-frequency resource set is a SearchSpaceId.

In one subembodiment, the index employed by the first time-frequency resource set is assigned for a multicast/groupcast service.

In one subembodiment, the first time-frequency resource set is assigned for a multicast/groupcast service.

In one subembodiment, there is no physical layer dynamic signaling used for scheduling a unicast service in the first time-frequency resource set.

In one subembodiment, there is no PDCCH used for scheduling a unicast service in the first time-frequency resource set.

In one subembodiment, there is no PSCCH used for scheduling a unicast service in the first time-frequency resource set.

In one subembodiment, a transport channel carrying the given first-type signal includes a Single-Cell Shared Channel (SC-SCH).

In one subembodiment, a transport channel carrying the given first-type signal includes a Point-To-Multipoint Shared Channel (PTM-SCH).

In one embodiment, the first information block is carried through an RRC signaling.

In one embodiment, the second information block is carried through an RRC signaling.

In one embodiment, the first time-frequency resource pool includes one or more Physical Uplink Control Channel (PUCCH) resource sets.

In one embodiment, the first time-frequency resource pool includes one or more Physical Uplink Control Channel (PUCCH) resources.

In one embodiment, the second time-frequency resource pool includes one or more Physical Uplink Control Channel (PUCCH) resource sets.

In one embodiment, the second time-frequency resource pool includes one or more Physical Uplink Control Channel (PUCCH) resources.

In one embodiment, the target time-frequency resource set occupies one PUCCH resource.

In one embodiment, the above phrase that the first information block is specific to the first node U1 means: the first information block is UE-specific.

In one embodiment, the above phrase that the first information block is specific to the first node U1 means: the first information block is configured for the first node only.

In one embodiment, the above phrase that the second information block is specific to a cell group means: the second information block is configured in multiple cells, and the multiple cells belong to one cell group.

In one subembodiment, all cells in the cell group support an SC-PTM.

In one subembodiment, the cell group is one TAG.

In one embodiment, the above phrase that the second information block is specific to a cell group means: the second time-frequency resource pool configured by the second information block is shared by the cells in the cell group.

In one embodiment, the K1 first-type signals include K2 first-type signals that all carry the first identifier, and the K1 first-type signals include K3 first-type signals that all carry the second identifier, the K2 and the K3 are positive integers greater than 0, and a summation of the K2 and the K3 is equal to the K1; K2 first-type information blocks among the K1 first-type information blocks are used for indicating whether the K2 first-type signals are correctly received respectively, K3 first-type information blocks among the K1 first-type information blocks are used for indicating whether the K3 first-type signals are correctly received respectively; the K1 first-type information blocks are mapped in sequence in the first bit block; any one of the K2 first-type information blocks occupies a bit that is earlier in position than a bit occupied by any one of the K3 first-type information blocks in the first bit block, or any one of the K3 first-type information blocks occupies a bit that is earlier in position than a bit occupied by any one of the K2 first-type information blocks in the first bit block.

In one subembodiment, the above phrase that any one of the K2 first-type information blocks occupies a bit that is earlier in position than a bit occupied by any one of the K3 first-type information blocks in the first bit block means: any one of the K2 first-type information blocks occupies a W1 th bit in the first bit block, any one of the K3 first-type information blocks occupies a W2th bit in the first bit block, wherein the W1 and the W2 are two different non-negative integers, and the W1 is less than the W2.

In one subembodiment, the above phrase that any one of the K2 first-type information blocks occupies a bit that is earlier in position than a bit occupied by any one of the K3 first-type information blocks in the first bit block means: any one of the K2 first-type information blocks occupies bits X1th to X2th in the first bit block, any one of the K3 first-type information blocks occupies bits X3th to X4th in the first bit block, wherein the X1 and the X2 are both non-negative integers and the X2 is greater than the X1, the X3 and the X4 are both non-negative integers and the X4 is greater than the X3, wherein the X3 is greater than the X2.

In one subembodiment, the above phrase that any one of the K3 first-type information blocks occupies a bit that is earlier in position than a bit occupied by any one of the K2 first-type information blocks in the first bit block means: any one of the K3 first-type information blocks occupies a W1 th bit in the first bit block, any one of the K2 first-type information blocks occupies a W2th bit in the first bit block, wherein the W1 and the W2 are two different non-negative integers, and the W1 is less than the W2.

In one subembodiment, the above phrase that any one of the K3 first-type information blocks occupies a bit that is earlier in position than a bit occupied by any one of the K2 first-type information blocks in the first bit block means: any one of the K3 first-type information blocks occupies bits X1th to X2th in the first bit block, any one of the K2 first-type information blocks occupies bits X3th to X4th in the first bit block, wherein the X1 and the X2 are both non-negative integers and the X2 is greater than the X1, the X3 and the X4 are both non-negative integers and the X4 is greater than the X3, wherein the X3 is greater than the X2.

In one subembodiment, any one of the K2 first-type signals is used for a unicast service.

In one subembodiment, any one of the K3 first-type signals is used for a multicast/groupcast service.

In one subembodiment, the K2 first-type information blocks are K2 HARQ-ACK feedbacks respectively.

In one subembodiment, the K3 first-type information blocks are K3 HARQ-ACK feedbacks respectively.

In one subembodiment, the first bit block includes a first bit subblock and a second bit subblock, the first bit subblock includes K2 first-type information blocks, the second bit subblock includes K3 first-type information blocks, the first bit subblock and the second bit subblock are mapped in sequence in the first bit block.

In one affiliated embodiment of the above subembodiment, the K2 first-type signals are associated to the K2 first-type information blocks in sequence based on the order of the time domain being first, the SPS PDSCH configuration identifier being second and the employed index being third.

In one affiliated embodiment of the above subembodiment, the K2 first-type information blocks are mapped in sequence in the first bit subblock.

In one affiliated embodiment of the above subembodiment, the K3 first-type signals are associated to the K3 first-type information blocks in sequence based on the order of the time domain being first, the SPS PDSCH configuration identifier being second and the employed index being third.

In one affiliated embodiment of the above subembodiment, the K3 first-type information blocks are mapped in sequence in the second bit subblock.

In one embodiment, any one of the K1 first-type signals carries the first identifier, a signal generated by the first bit block is QCLed (Quasi Co-located) to a first reference resource; or one of the K1 first-type signals carries the second identifier, a signal generated by the first bit block is QCLed to a second reference resource set; the first reference signal resource is non-QCLed to the second reference signal resource.

In one affiliated embodiment of the above subembodiment, the first reference signal resource includes at least one of a Channel State Information-Reference Signal (CSI-RS) resource or a Synchronization Signal/physical broadcast channel Block (SSB).

In one affiliated embodiment of the above subembodiment, the second reference signal resource includes at least one of a CSI-RS resource or an SSB.

In one affiliated embodiment of the above subembodiment, the first reference signal resource is associated to at least one of a CSI-RS resource identity or an SSB index.

In one affiliated embodiment of the above subembodiment, the second reference signal resource is associated to at least one of a CSI-RS resource identity or an SSB index.

In one affiliated embodiment of the above subembodiment, the first reference signal resource is UE-specific.

In one affiliated embodiment of the above subembodiment, the first reference signal resource is specific to the first node.

In one affiliated embodiment of the above subembodiment, the first reference signal resource is effective only in a cell to which the first node belongs.

In one affiliated embodiment of the above subembodiment, the first reference signal resource is specific to a cell group.

In one affiliated embodiment of the above subembodiment, the first reference signal resource is effective in multiple cells.

In one embodiment, at least one of the K1 first-type signalings occupies time domain resources that are later than those occupied by one of the K1 first-type signals.

Embodiment 6

Figure 6:
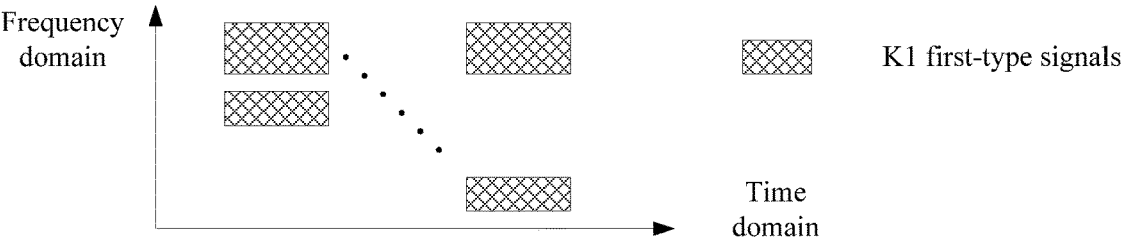
FIG. 6 is a diagram illustrating K1 first-type signals according to one embodiment of the disclosure.

Embodiment 6 illustrates a diagram of K1 first-type signals, as shown in FIG. 6. In FIG. 6, at least two of the K1 first-type signals occupy overlapping time domain resources; and at least two of the K1 first-type signals are transmitted in one same BWP of one same carrier.

In one embodiment, the K1 first-type signals occupy K1 separate HARQ process numbers respectively.

In one embodiment, the K1 first-type signals are generated by K1 TBs respectively.

In one embodiment, the K1 first-type signals are generated by K1 CBGs respectively.

In one embodiment, at least two of the K1 first-type signals occupy different numbers of Resource Elements (REs).

In one embodiment, at least two of the K1 first-type signals are generated by one TB and one CBG respectively.

In one embodiment, any one of the K1 first-type signals occupies a positive integer number of REs which is greater than 1.

Embodiment 7

Embodiment 7 illustrates a diagram of a first bit block, as shown in FIG. 7. In FIG. 7, the first bit block includes K1 first-type information blocks, and the K1 first-type information blocks are used for indicating whether the K1 first-type signals are correctly received respectively; the K1 first-type information blocks include a first-type information block #1 to a first-type information block #K1 shown in the figure; the K1 first-type signals include a first-type signal #1 to a first-type signal #K1 shown in the figure; a given first-type signal is any one of the K1 first-type signals, a given first-type information block among the K1 first-type information blocks is used for indicating whether the given first-type signal is correctly received.

In one embodiment, whether the given first-type signal carries the second identifier in the disclosure is used for determining a position of the given first-type information block in the first bit block.

In one embodiment, an identifier of a serving cell where frequency domain resources occupied by the given first-type signal reside is used for determining a position of the given first-type information block in the first bit block.

In one embodiment, a configuration of an SPS PDSCH employed by the given first-type signal is used for determining a position of the given first-type information block in the first bit block.

In one embodiment, a position of time domain resources occupied by the given first-type signal is used for determining a position of the given first-type information block in the first bit block.

Embodiment 8

Embodiment 8 illustrates another diagram of a first bit block, as shown in FIG. 8. In FIG. 8, the first bit block in the disclosure includes a first bit subblock and a second bit subblock; K1 first-type signals include K2 first-type signals that all carry the first identifier, and the K1 first-type signals include K3 first-type signals that all carry the second identifier, the K2 and the K3 are positive integers greater than 0, and a summation of the K2 and the K3 is equal to the K1; K2 first-type information blocks among the K1 first-type information blocks are used for indicating whether the K2 first-type signals are correctly received respectively, K3 first-type information blocks among the K1 first-type information blocks are used for indicating whether the K3 first-type signals are correctly received respectively; the first bit subblock includes the K2 first-type information blocks, and the second bit subblock includes the K3 first-type information blocks; the K2 first-type information blocks are arranged in sequence in the first bit subblock, and the K3 first-type information blocks are arranged in sequence in the second bit subblock.

In one embodiment, a third signal is any one of the K2 first-type signals, and a third information block among the K2 first-type information blocks is used for indicating whether the third signal is correctly received.

In one subembodiment, an identifier of a serving cell where frequency domain resources occupied by the third signal reside is used for determining a position of the third information block in the first bit subblock.

In one embodiment, a configuration of an SPS PDSCH employed by the third signal is used for determining a position of the third information block in the first bit subblock.

In one embodiment, a position of time domain resources occupied by the third signal is used for determining a position of the third information block in the first bit subblock.

In one embodiment, a fourth signal is any one of the K3 first-type signals, and a fourth information block among the K3 first-type information blocks is used for indicating whether the fourth signal is correctly received.

In one subembodiment, an identifier of a serving cell where frequency domain resources occupied by the fourth signal reside is used for determining a position of the fourth information block in the second bit subblock.

In one embodiment, a configuration of an SPS PDSCH employed by the fourth signal is used for determining a position of the fourth information block in the second bit subblock.

In one embodiment, a position of time domain resources occupied by the fourth signal is used for determining a position of the fourth information block in the second bit subblock.

Embodiment 9

Embodiment 9 illustrates a diagram of a first time-frequency resource pool and a second time-frequency resource pool, which correspond to a solid line box and a dotted line box shown in the figure respectively, as shown in FIG. 9. In FIG. 9, the first time-frequency resource pool includes Q1 first-type candidate resource sets, the second time-frequency resource pool includes Q2 second-type candidate resource sets; the Q1 and the Q2 are positive integers greater than 1 respectively.

In one embodiment, the K1 first-type signals all carry the first identifier, a first candidate resource set is one of the Q1 first-type candidate resource sets, and the target time-frequency resource set is the first candidate resource set.

In one subembodiment, the K1 first-type signalings are all associated to the first candidate resource set.

In one subembodiment, the K1 first-type signalings are all used for indicating the first candidate resource set.

In one embodiment, one of the K1 first-type signals carries the second identifier, a second candidate resource set is one of the Q2 second-type candidate resource sets, and the target time-frequency resource set is the second candidate resource set.

In one subembodiment, a first-type signaling corresponding to the first-type signal carrying the second identifier is associated to the second candidate resource set.

In one subembodiment, a first-type signaling corresponding to the first-type signal carrying the second identifier is used for indicating the second candidate resource set.

In one subembodiment, a first-type signaling corresponding to the first-type signal carrying the first identifier is associated to the first candidate resource set, and the first candidate resource set is one of the Q1 first-type candidate resource sets.

In one subembodiment, a first-type signaling corresponding to the first-type signal carrying the first identifier is used for indicating the first candidate resource set, and the first candidate resource set is one of the Q1 first-type candidate resource sets.

In one embodiment, any one of the Q1 first-type candidate resource sets is PUCCH resources.

In one embodiment, any one of the Q2 second-type candidate resource sets is PUCCH resources.

Embodiment 10

Embodiment 10 illustrates a structure block diagram of a first node, as shown in FIG. 10. In FIG. 10, the first node 1000 includes a first receiver 1001 and a first transmitter 1002.

The first receiver 1001 receives K1 first-type signals, the K1 being a positive integer greater than 1.

The first transmitter 1002 transmits a target signal, the target signal carrying a first bit block, the first bit block including a positive integer number of bits which is greater than 1.

In Embodiment 10, the first bit block includes K1 first-type information blocks, the K1 first-type information blocks are used for indicating whether the K1 first-type signals are correctly received respectively; a target identifier is used for generating a scrambling code of the target signal; one of the K1 first-type signals carries a first identifier, a second identifier is one identifier not equal to the first identifier, the target identifier is equal to one of the first identifier or the second identifier; whether one of the K1 first-type signals carries the second identifier is used for determining the target identifier; the first identifier and the second identifier are both integers.

In one embodiment, the first receiver 1001 receives K1 first-type signalings; the K1 first-type signalings are used for indicating K1 first-type time-frequency resource sets respectively, and the K1 first-type signals occupy the K1 first-type time-frequency resource sets respectively.

In one embodiment, the K1 first-type signals include a first signal and a second signal, the first signal carries the first identifier, the second signal carries the second identifier, and the target identifier is the second identifier.

In one embodiment, a given first-type signal carries the second identifier and the given first-type signal is one of the K1 first-type signals, the given first-type signal meets one of the following:

a CRC included in a physical layer dynamic signaling that schedules the given first-type signal is scrambled with the second identifier;

time-frequency resources occupied by a physical layer dynamic signaling that schedules the given first-type signal belongs to a first time-frequency resource set, the first time-frequency resource set employs a fixed index, or the first time-frequency resource set employs an index which is configured through a higher layer signaling; and a transport channel carrying the given first-type signal is a channel other than downlink shared channels.

In one embodiment, the first receiver 1001 receives a first information block and a second information block; the first information block is used for indicating a first time-frequency resource pool, and the occupies a target time-frequency resource set; when the target identifier is the first identifier, the target time-frequency resource set belongs to the first time-frequency resource pool; when the target identifier is the second identifier, the target time-frequency resource set belongs to the second time-frequency resource pool; the first information block is specific to a first node, and the second information block is specific to a cell group.

In one embodiment, the K1 first-type signals include K2 first-type signals that all carry the first identifier, and the K1 first-type signals include K3 first-type signals that all carry the second identifier, the K2 and the K3 are positive integers greater than 0, and a summation of the K2 and the K3 is equal to the K1; K2 first-type information blocks among the K1 first-type information blocks are used for indicating whether the K2 first-type signals are correctly received respectively, K3 first-type information blocks among the K1 first-type information blocks are used for indicating whether the K3 first-type signals are correctly received respectively; the K1 first-type information blocks are mapped in sequence in the first bit block; any one of the K2 first-type information blocks occupies a bit that is earlier in position than a bit occupied by any one of the K3 first-type information blocks in the first bit block, or any one of the K3 first-type information blocks occupies a bit that is earlier in position than a bit occupied by any one of the K2 first-type information blocks in the first bit block.

In one embodiment, any one of the K1 first-type signals carries the first identifier, a signal generated by the first bit block is QCLed to a first reference resource; or one of the K1 first-type signals carries the second identifier, a signal generated by the first bit block is QCLed to a second reference resource set; the first reference signal resource is non-QCLed to the second reference signal resource.

In one embodiment, the first receiver 1001 includes at least the former four of the antenna 452, the receiver 454, the multiantenna receiving processor 458, the receiving processor 456 or the controller/processor 459 illustrated in Embodiment 4.

In one embodiment, the first transmitter 1002 includes at least the former four of the antenna 452, the transmitter 454, the multiantenna transmitting processor 457, the transmitting processor 468 or the controller/processor 459 illustrated in Embodiment 4.

Embodiment 11

Embodiment 11 illustrates a structure block diagram of a second node, as shown in FIG. 11. In FIG. 11, a second node 1100 includes a second transmitter 1101 and a second receiver 1102.

The second transmitter 1101 transmits K1 first-type signals, the K1 being a positive integer greater than 1.

The second receiver 1102 receives a target signal, the target signal carrying a first bit block, the first bit block including a positive integer number of bits which is greater than 1.

In Embodiment 11, the first bit block includes K1 first-type information blocks, the K1 first-type information blocks are used for indicating whether the K1 first-type signals are correctly received respectively; a target identifier is used for generating a scrambling code of the target signal; one of the K1 first-type signals carries a first identifier, a second identifier is one identifier not equal to the first identifier, the target identifier is equal to one of the first identifier or the second identifier; whether one of the K1 first-type signals carries the second identifier is used for determining the target identifier; the first identifier and the second identifier are both integers.

In one embodiment, the second transmitter 1101 transmits K1 first-type signalings; the K1 first-type signalings are used for indicating K1 first-type time-frequency resource sets respectively, and the K1 first-type signals occupy the K1 first-type time-frequency resource sets respectively.

In one embodiment, the K1 first-type signals include a first signal and a second signal, the first signal carries the first identifier, the second signal carries the second identifier, and the target identifier is the second identifier.

In one embodiment, a given first-type signal carries the second identifier and the given first-type signal is one of the K1 first-type signals, the given first-type signal meets one of the following:

a CRC included in a physical layer dynamic signaling that schedules the given first-type signal is scrambled with the second identifier;

time-frequency resources occupied by a physical layer dynamic signaling that schedules the given first-type signal belongs to a first time-frequency resource set, the first time-frequency resource set employs a fixed index, or the first time-frequency resource set employs an index which is configured through a higher layer signaling; and a transport channel carrying the given first-type signal is a channel other than downlink shared channels.

In one embodiment, the second transmitter 1101 transmits a first information block and a second information block; the first information block is used for indicating a first time-frequency resource pool, and the second information block is used for indicating a second time-frequency resource pool; the target signal occupies a target time-frequency resource set; when the target identifier is the first identifier, the target time-frequency resource set belongs to the first time-frequency resource pool; when the target identifier is the second identifier, the target time-frequency resource set belongs to the second time-frequency resource pool; the first information block is specific to a first node, and the second information block is specific to a cell group.

In one embodiment, the K1 first-type signals include K2 first-type signals that all carry the first identifier, and the K1 first-type signals include K3 first-type signals that all carry the second identifier, the K2 and the K3 are positive integers greater than 0, and a summation of the K2 and the K3 is equal to the K1; K2 first-type information blocks among the K1 first-type information blocks are used for indicating whether the K2 first-type signals are correctly received respectively, K3 first-type information blocks among the K1 first-type information blocks are used for indicating whether the K3 first-type signals are correctly received respectively; the K1 first-type information blocks are mapped in sequence in the first bit block; any one of the K2 first-type information blocks occupies a bit that is earlier in position than a bit occupied by any one of the K3 first-type information blocks in the first bit block, or any one of the K3 first-type information blocks occupies a bit that is earlier in position than a bit occupied by any one of the K2 first-type information blocks in the first bit block.

In one embodiment, any one of the K1 first-type signals carries the first identifier, a signal generated by the first bit block is QCLed to a first reference resource; or one of the K1 first-type signals carries the second identifier, a signal generated by the first bit block is QCLed to a second reference resource set; the first reference signal resource is non-QCLed to the second reference signal resource.

In one embodiment, the second transmitter 1101 includes at least the former four of the antenna 420, the transmitter 418, the multiantenna transmitting processor 471, the transmitting processor 416 or the controller/processor 475 illustrated in Embodiment 4.

In one embodiment, the second receiver 1102 includes at least the former four of the antenna 420, the receiver 418, the multiantenna receiving processor 472, the receiving processor 470 or the controller/processor 475 illustrated in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The first node in the disclosure includes but not limited to mobile phones, tablet computers, laptops, network cards, low-power equipment, eMTC terminals, NB-IOT terminals, vehicle-mounted communication equipment, transport tools, vehicles, RSUs, aircrafts, airplanes, unmanned aerial vehicles, telecontrolled aircrafts, and other radio communication equipment. The second node in the disclosure includes but not limited to macro-cellular base stations, micro-cellular base stations, pico-cellular base stations, home base stations, relay base stations, eNBs, gNBs, TRPs, GNSSs, relay satellites, satellite base stations, air base stations, RSUs, unmanned aerial vehicles, testing equipment, for example, transceiver or signaling tester simulating part functions of a base station, and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A User Equipment (UE) comprising:
    a receiver configured to receive a number of first-type signals; and
    a transmitter configured to transmit a target signal carrying a bit block,
    wherein the bit block comprises a number of information blocks, the number of information blocks are used for respectively indicating whether the number of signals are correctly received, wherein a target identifier is used for generating a scrambling code of the target signal, wherein one of the first-type signals carries a first identifier, wherein the target identifier is equal to one of the first identifier or a second identifier different from the first identifier, and wherein the target identifier is determined based on whether one of the first-type signals carries the second identifier.

2. The UE according to claim 1, wherein the receiver is configured to receive a number of first-type signalings, wherein the number of first-type signalings are used for indicating a number of time-frequency resource sets respectively, and wherein the number of first-type signals respectively occupy the number of time-frequency resource sets.

3. The UE according to claim 1, wherein the number of first-type signals at least comprise a first signal and a second signal, wherein the first signal carries the first identifier, wherein the second signal carries the second identifier, and wherein the target identifier is the second identifier.

4. The UE according to claim 3, wherein any one of the number of first-type signals carries the first identifier, wherein: a signal generated by the bit block is Quasi Co-Located (QCLed) with a first reference signal resource or one of the number of first-type signals carries the second identifier, wherein a signal generated by the bit block is QCLed with a second reference signal resource; and the reference signal resource is non-QCLed with the second reference signal resource.

5. The UE according to any one of claim 1, wherein one of the first-type signals carries the second identifier, wherein:
    a Cyclic Redundancy Check (CRC) included in a physical layer dynamic signal that schedules the one of the first-type signal is scrambled with the second identifier;
    time-frequency resources occupied by a physical layer dynamic signal that schedules the one of the first-type signal belongs to a time-frequency resource set, wherein the time-frequency resource set employs a fixed index, or the time-frequency resource set employs an index which is configured through a higher layer signaling; or
    a transport channel carrying the one of the first-type signal is a channel other than a downlink shared channel.

6. The UE according to claim 1, wherein the receiver is configured to receive a first one of the information blocks and a second one of the information blocks, wherein the first one of the information blocks is used for indicating a first time-frequency resource pool, and the second one of the information blocks is used for indicating a second time-frequency resource pool, wherein the target signal occupies a target time-frequency resource set, wherein, when the target identifier is the first identifier, a target time-frequency resource set belongs to the first time-frequency resource pool, wherein, when the target identifier is the second identifier, the target time-frequency resource set belongs to the second time-frequency resource pool, and wherein the first information block is specific to the UE, and the second one of the information block is specific to a cell group.

7. The UE according to claim 6, wherein at least one of the number of first-type signalings is used for indicating the target time-frequency resource set.

8. The UE according to claim 1, wherein the number first-type signals comprise a first subset of first-type signals that carry the first identifier, wherein the number of first-type signals comprise a second subset of first-type signals that carry the second identifier, and wherein a summation of a number of the first subset and the second subset is equal to the number of first-type signals.

9. The UE according to claim 1,
    wherein a generator of a scrambling sequence employed by the first-type signal is initialized through the second identifier;
    wherein a CRC in the first-type signal is scrambled with the second identifier, wherein the first-type signal is used for indicating the first identifier, and wherein the first-type signal comprises the first identifier.

10. The UE according to claim 1,
    wherein a generator of a scrambling sequence employed by the first-type signal is initialized through the first identifier,
    wherein a CRC comprised in the first-type signal is scrambled with the second identifier,
    wherein the first-type signal is used for indicating the second identifier, and
    wherein the first-type signal comprises the second identifier.

11. A method performed by a User Equipment (UE), the method comprising:
    receiving a number of first-type signals; and
    transmitting a target signal carrying a bit block, wherein the bit block comprises a number of information blocks, the number of information blocks are used for respectively indicating whether the number of first-type signals are correctly received, wherein a target identifier is used for generating a scrambling code of the target signal, wherein one of the first-type signals carries a first identifier, wherein the target identifier is equal to one of the first identifier or a second identifier different from the first identifier, and wherein the target identifier is determined based on whether one of the first-type signals carries the second identifier.

12. The method according to claim 11, further comprising receiving a number of first-type signalings, wherein the number of first-type signalings are used for indicating a number of time-frequency resource sets respectively, and wherein the number of first-type signals respectively occupy the number of time-frequency resource sets.

13. The method according to claim 11, wherein the number of first-type signals at least comprise a first signal and a second signal, wherein the first signal carries the first identifier, wherein the second signal carries the second identifier, and wherein the target identifier is the second identifier.

14. The method according to claim 13, wherein any one of the number of first-type signals carries the first identifier, wherein: a signal generated by the bit block is Quasi Co-Located (QCLed) with a first reference signal resource or one of the number of first-type signals carries the second identifier, wherein a signal generated by the bit block is QCLed with a second reference signal resource, and wherein the reference signal resource is non-QCLed with the second reference signal resource.

15. The method according to claim 11, wherein one of the first-type signals carries the second identifier, wherein:

a Cyclic Redundancy Check (CRC) included in a physical layer dynamic signal that schedules the one of the first-type signal is scrambled with the second identifier;

time-frequency resources occupied by a physical layer dynamic signal that schedules the one of the first-type signals belongs to a time-frequency resource set, wherein the time-frequency resource set employs a fixed index, or the time-frequency resource set employs an index which is configured through a higher layer signaling; or a transport channel carrying the one of the first-type signals is a channel other than a downlink shared channel.

16. The method according to claim 11, wherein the receiver is configured to receive a first one of the information blocks and a second one of the information blocks, wherein the first one of the information blocks is used for indicating a first time-frequency resource pool, and the second one of the information blocks is used for indicating a second time-frequency resource pool, wherein the target signal occupies a target time-frequency resource set, wherein, when the target identifier is the first identifier, a target time-frequency resource set belongs to the first time-frequency resource pool, wherein, when the target identifier is the second identifier, the target time-frequency resource set belongs to the second time-frequency resource pool, and wherein the first information block is specific to the UE, and the second one of the information block is specific to a cell group.

17. The method according to claim 16, wherein at least one of the number of first-type signalings is used for indicating the target time-frequency resource set.

18. The method according to claim 11, wherein the number first-type signals comprise a first subset of first-type signals that carry the first identifier, wherein the number of first-type signals comprise a second subset of first-type signals that carry the second identifier, and wherein a summation a number of the first subset and the second subset is equal to the number of first-type signals.

19. The method according to claim 11, wherein a generator of a scrambling sequence employed by the first-type signal is initialized through the first identifier;

wherein a CRC included in the first-type signal is scrambled with the first identifier, wherein the first-type signal is used for indicating the first identifier, and wherein the first-type signal comprises the first identifier.

20. The method according to claim 11, wherein a generator of a scrambling sequence employed by the first-type signal is initialized through the second identifier, wherein a CRC comprised in the first-type signal is scrambled with the second identifier, wherein the first-type signal is used for indicating the second identifier, and wherein the first-type signal comprises the second identifier.

* * * * *